United States Patent [19]
Colianni

[11] 3,776,178
[45] Dec. 4, 1973

[54] MACHINE FRAME STRUCTURE
[76] Inventor: William D. Colianni, 4179 Way Barry Ave., Chicago, Ill. 60641
[22] Filed: Sept. 11, 1972
[21] Appl. No.: 287,904

[52] U.S. Cl............. 116/137 A, 73/71.5 U, 248/13, 248/16, 248/125, 355/63
[51] Int. Cl............................................. B06b 3/00
[58] Field of Search.................................. 116/137 A; 73/71.5 U, 67.8, 67.9, 71.5; 355/55, 62, 63; 248/125, 16, 13, 2

[56] References Cited
UNITED STATES PATENTS
| | | | |
|---|---|---|---|
| 2,353,465 | 7/1944 | Heath | 248/2 |
| 3,044,351 | 7/1962 | Patterson | 355/63 X |
| 3,504,534 | 4/1970 | Mandula, Jr. | 73/71.5 U |
| 3,601,084 | 8/1971 | Bird | 116/137 A |

Primary Examiner—Louis J. Capozi
Attorney—Fred S. Lockwood et al.

[57] ABSTRACT
Improved means for supporting and guiding superposed or vertically aligned and coupled converter and resonator or horn in apparatus for applying sonic or ultrasonic energy with precise and accurate reciprocatory movement with respect to a workpiece disposed on an anvil. The improved support and guide means includes a pair of spaced upright support and guide rods carried on cantilever frame means. A pair of vertically space bushings or an elongated bushing is slidably mounted on each support and guide rod so as to provide at least spaced two-point support on each rod. The converter is suitably mounted or supported on the bushings so as to be vertically reciprocable toward and away from the anvil in an accurate and precise path. A double acting cylinder, a single acting cylinder in combination with a compression spring, or other suitable power means is operatively connected for controllably raising and lowering the converter together with the resonator or horn coupled thereto toward and away from the anvil. The vertical guide and support rods are mounted on a cantilever frame together with the power means for reciprocating the coupled converter and resonator.

5 Claims, 10 Drawing Figures

PATENTED DEC 4 1973

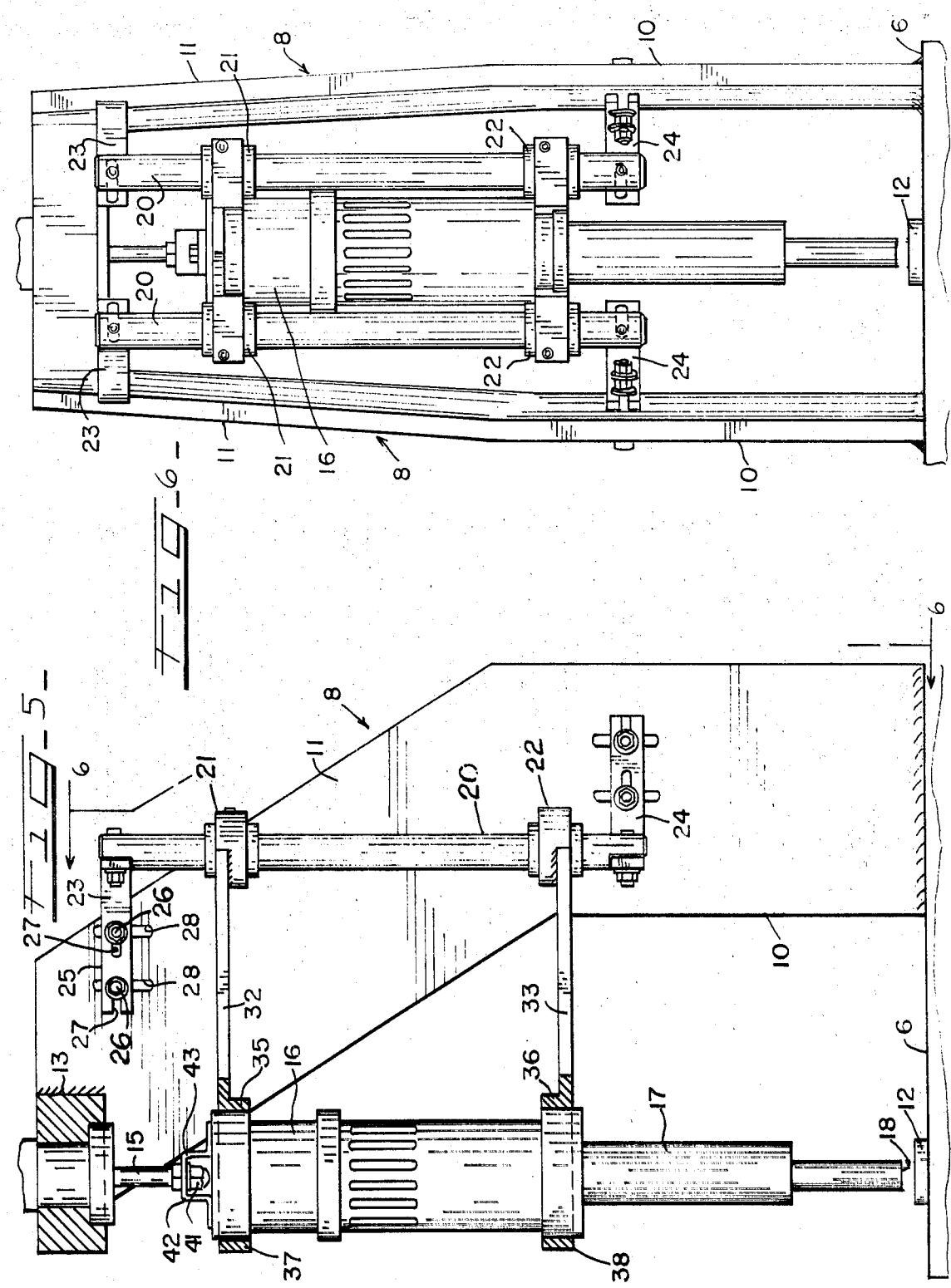

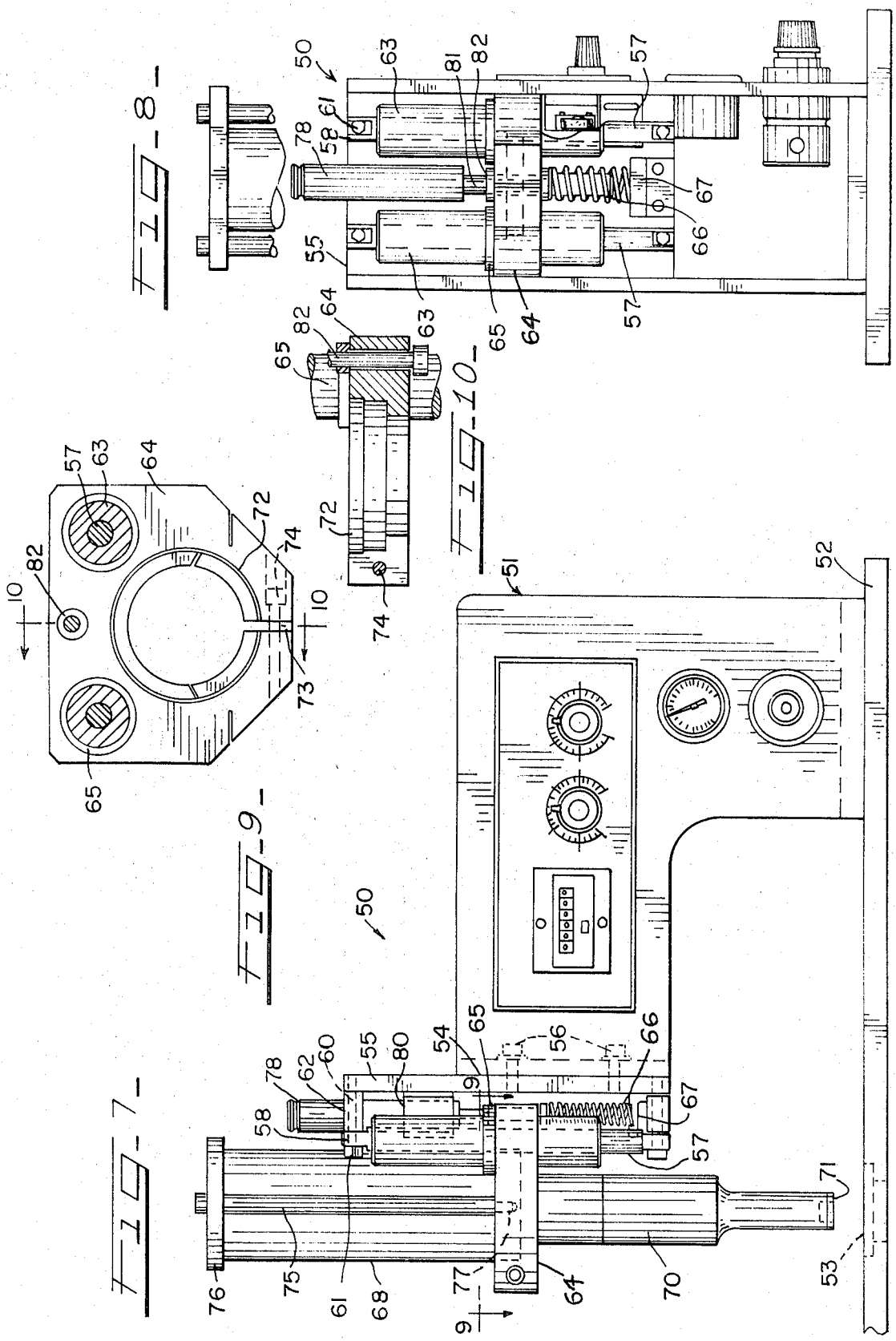

MACHINE FRAME STRUCTURE

This invention relates, generally, to innovations and improvements in apparatus for applying with precision and accuracy sonic or ultrasonic energy to workpieces supported on an anvil or the like. More specifically, the invention relates to innovations and improvements in the means for supporting operatively coupled, and superposed or vertically aligned, converter and resonator or horn units for reciprocatory movement toward and away from an anvil whereby the sonic or ultrasonic energy may be accurately and precisely applied at the horn output end or operating end surface on a repetitive and rapidly repeated basis to workpieces supported on an anvil.

It has been known to provide apparatus of this general type wherein units comprising a converter with a resonator or horn coupled thereto are used to apply sonic energy to workpieces of various types supported on an appropriate anvil by lowering the output end or operating end surface of the horn onto the workpiece thereby applying sonic or ultrasonic energy thereto so as to perform a desired operation such as bonding two layers of film together, forming button holes as taught in my U.S. Pats. Nos. 3,558,381 and 3,565,732, or for performing any other desired operation of the type which takes advantage of the peculiar characteristics provided by sonic or ultrasonic energy. In many instances it is important, if not essential, to be able to rapidly lower and apply the output or active end of the horn or resonator to the workpiece on a repetitive basis with a high degree of precision and control so as to obtain not only the optimum results but to do so on a production basis while maintaining uniform quality.

The present invention provides an improved frame structure or structural support arrangement and improved support and guide arrangement whereby the reciprocatory movement of coupled converter and resonator or horn combinations may be supported and guided in sonic or ultrasonic apparatus of the type described.

An important object of the invention is an improved arrangement, including special frame means, for supporting a pair of upstanding parallel support and guide rods on which vertically spaced bushings or elongated bushings slide and from which bushings or bushing means the converter component of the apparatus is supported and in turn the resonator or horn that is coupled thereto is supported.

An important object of the invention is the provision of improved support and guiding means in sonic or ultrasonic energy apparatus of the type described characterized by: provision for convenient realignment of the vertical support and guide rods; precision control of the pressure exerted by the output or operating end of the resonator or horn on the workpiece; ability to increase the size of the apparatus while adhering to the basic design to include any desired number of converter/resonator or horn units on an expanded frame structure; and, which takes advantage of cantilever type frame means.

Certain other and more specific objects of the invention will in part be obvious and will in part appear hereinafter.

For a more complete understanding of the nature and scope of the invention, reference may now be had to the following detailed description thereof taken in connection with the accompanying drawings, wherein:

FIG. 5 is a view partly in section and partly in elevation taken on line 5—5 of FIG. 3;

FIG. 6 is a rear elevational view of the apparatus shown in FIG. 1;

FIG. 7 is a side elevational view of a sonic or ultrasonic apparatus forming a second embodiment of the invention;

FIG. 8 is a front elevational view with certain parts being broken away of the apparatus shown in FIG. 7;

FIG. 9 is a detail sectional view taken on line 9—9 of FIG. 7; and

FIG. 10 is a detail sectional view taken on line 10—10 of FIG. 9.

Figure 1:
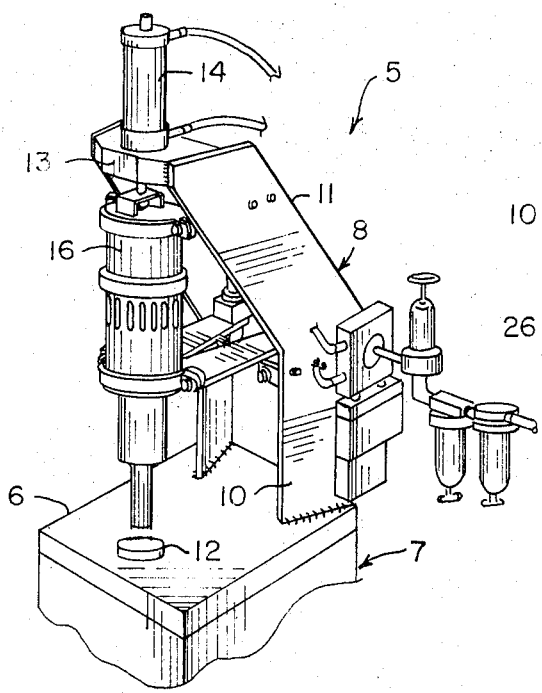
FIG. 1 is a perspective view taken from the front side and at a slight elevation of an apparatus for repetitively applying sonic or ultrasonic energy to workpieces on an anvil and forming one embodiment of the present invention.
Figure 3:
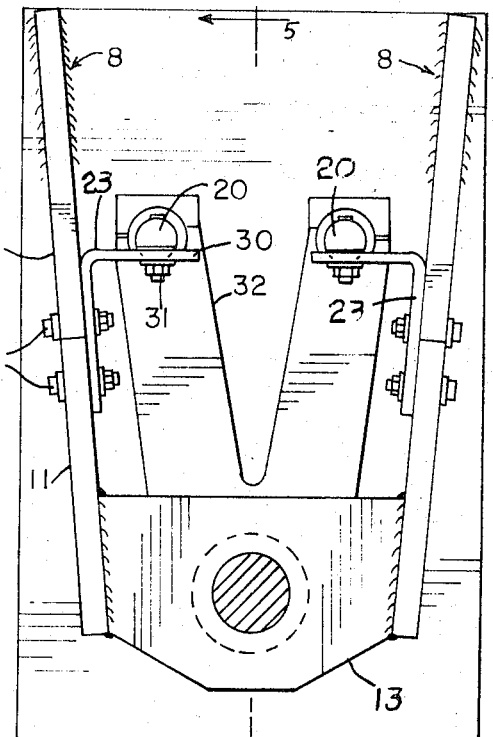
FIG. 3 is a top plan view of the apparatus shown in FIG. 1.
Figure 2:
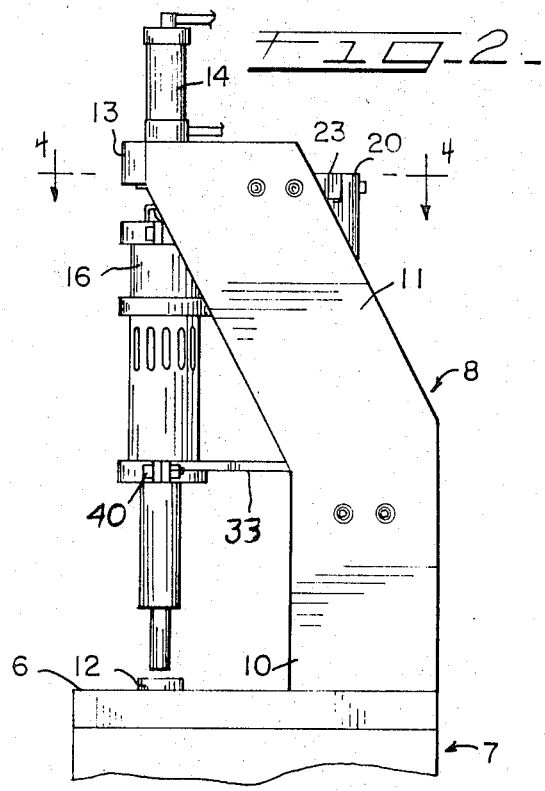
FIG. 2 is a side elevation of the apparatus shown in FIG. 1.
Figure 4:
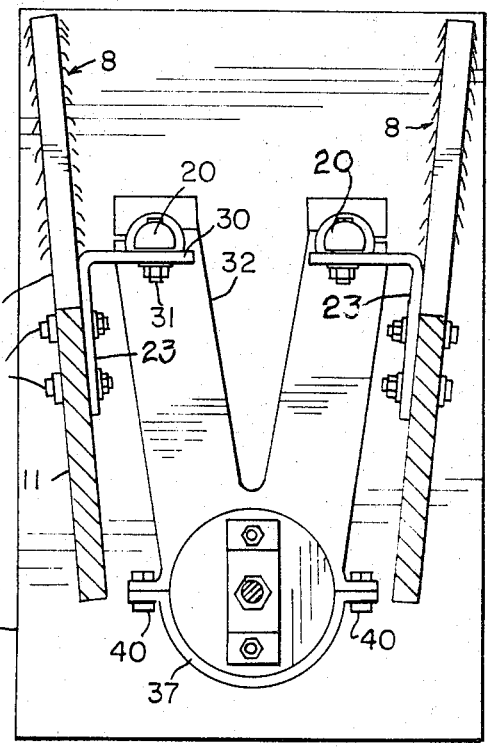
FIG. 4 is a sectional view taken on line 4—4 of FIG. 2.

Referring to the embodiment of the invention shown in FIGS. 1–6, the sonic or ultrasonic energy applying apparatus is indicated generally at 5 therein and is shown mounted on the top 6 of a suitable base or support 7 such as a table or a cabinet which may be used to house certain attachments or accessories (not shown) such as a compressor, electrical power supply, etc.

The main support and frame elements for the apparatus comprise a pair of dog-leg plate members 8—8 which may be formed of a structurally strong material, preferably steel plate, although other materials may be used such as aluminim, plywood, etc. The plate members 8 provide cantilever support in that they have vertical base or support portions 10—10 suitably mounted on the platform 6 such as by welding in the case of steel and integrally extending above the vertical base portions 10 at an angle are upper inclined portions 11—11. Preferably, the upper and forward ends of the portions 11 extend over the anvil of the apparatus which is indicated at 12 and mounted on the platform 6. In addition it is preferred that the plates 8 be angled or toed in toward the anvil 12 which supports the workpieces.

The basic frame structure of the apparatus 5 includes a horizontal block or plate 13 mounted in between and interconnecting the upper ends of the inclined portions 11 of the plates 8 to also provide support for a double acting pneumatic cylinder unit 14. The connecting rod 15 of the power cylinder 14 projects from the underside with the bottom end thereof suitably connected to the upper end of a converter unit 16 of known type used for sonic or ultrasonic apparatus. A resonator or horn 17 of known type is suitably coupled to and underneath the converter 16 in vertical alignment therewith and with the output end or surface 18 disposed directly above the anvil 12.

The primary means for supporting and guiding the vertical reciprocatory movement of the unit comprising converter 16 with the resonator or horn 17 coupled thereto is provided by a pair of vertical or upright support rods 20—20 which are suitably mounted to the rear of the converter 16. These rods 20—20 are accurately finished or machined for supporting and guiding on each rod a pair of upper and lower bushings 21 and 22 respectively.

The rods 20—20 are supported on the insides of the plate members 8 and each rod is supported at its upper end by an L-shaped bracket 23 and at the bottom by another L-shaped bracket 24. One of the legs of each upper bracket 23 is bolted to the inclined portion 11 of one of the plates 8 by means of a pair of horizontally aligned nut and bolt fasteners indicated at 26—26. In order to facilitate vertical alignment and proper positioning the leg 25 of each bracket 23 is provided with a pair of horizontally extending slots 27—27 for receiving the bolts 26—26 while the plate portion 11 is provided with vertically extending slots 28—28. It will thus be seen that when the bolts 26—26 are loosened the bolts may be shifted upwardly and downwardly in the slots 28 and the bracket 23 may be shifted horizontally on the bolts thereby providing ample adjustment for alignment. The leg 30 of each bracket 23 is secured by a nut and bolt fastener 31 to the upper end of the adjacent rod 20, the surface of which is notched so as to receive the bracket leg 30.

It will be understood that each lower bracket 24 is similarly mounted for vertical and horizontal adjustment on the inside of the lower or upright portion 10 of a plate 8 and is correspondingly attached to the bottom end of the guide rod 20.

In order to support the converter unit 16 from the vertically spaced bushings 21—21 and 22—22 a pair of upper and lower V-shaped or U-shaped bracket members or brackets 32 and 33, respectively, are provided. The distal ends of the legs or arms of the upper bracket 32 are suitably secured to the upper bushings 21—21 while the distal ends of the legs or arms of the lower bracket 33 are similarly secured to the lower bushings 22—22. The bight portion of each of the brackets 32 and 33 is formed with a semi-circular clamping recess and flange 35 or 36, (FIG. 5) respectively, for cooperation with a similarly shaped clamping member 37 and 38, respectively. The clamp members 37 and 38 have outwardly extending ears with apertures therein which register with apertures in mating outwardly extending ears on the brackets 32 and 33 so as to receive retaining nut and bolt fasteners therein as indicated at 40—40 in FIG. 4.

By means of the foregoing arrangement, it will be seen that the converter unit 16 is supported from adjacent its upper and lower ends with spaced two-point support from each of the support rods 20. Accordingly, the converter 16 is restricted to and provided with a smooth and accurate vertical reciprocatory movement without variation, shifting or distortion taking place.

In the apparatus the lower end of the connecting rod 15 of the double acting cylinder unit 14 is shown secured by means of a nut 41 (FIG. 5) to the raised portion 42 of a fitting 43 secured on the top surface of the converter unit 16. It will be seen that when the cylinder unit 14 is actuated, and the piston rod 15 thereof is in turn lowered or raised, the converter 16 is likewise lowered or raised. In turn the resonator or horn 17 is raised or lowered with the converter and the output end or output surface 18 thereof is similarly raised or lowered toward and away from the anvil 12 and a workpiece thereon.

If desired, a number of changes may be made in the sonic or ultrasonic apparatus 5 without departing from the basic design features and concepts thereof. For example, the double acting pneumatic cylinder 14 may be replaced with a hydraulic cylinder or a solenoid. Suitable control apparatus of known commercially available type may be used to control the double acting cylinder 14 or a hydraulic cylinder or solenoid substitute. The control apparatus may be man-operated by hand or foot, or it may be automatically operated, in known manner. While for maximum strength the plates 8—8 are toed in toward the anvil 12, they may be aligned in parallel relationship if the utmost strength is not required. Additional converter/resonator or horn units may be mounted by spacing the plates 8—8 apart and lengthing the support block 13. If desired, a greater number of the angled support plates 8 than two may be used to provide additional support and permit multiple or sequential operation with respect to a number of anvils.

By loosening the clamps 35–37 and 36–38 the converter 16 may be rotated through 360° for rotary adjustment of the output end or surface 18 as desired.

The second embodiment of the invention will now be described in connection with FIGS. 7–10 wherein the sonic or ultrasonic energy apparatus is indicated generally at 50 and comprises cantilever frame means 51 which is mounted on a suitable table or cabinet top or other horizontal platform 52 having a platen or anvil 53 mounted therein. It will be understood that the cantilever frame structure 51 may be enclosed to serve as the housing for certain of auxiliary components and controls of the apparatus which do not form a part of the invention and need not be described. The vertical face 54 of the overhanging or projecting portion of the cantilever structure 51 has a support plate 55 fixed thereto by means of bolts 56—56. A pair of spaced vertical support and guide rods 57—57 are mounted on the plate 55 at the upper and lower ends thereof. Referring to the upper end of a rod 57 as shown in FIG. 7 for example, it is notched on opposite sides so as to provide an upstanding rectangular lug or boss 58 which is apertured and through which projects a horizontal bolt 60. The head 61 of bolt 60 is drawn up against one side of the lug or boss portion 58 while the opposite end porjects into a threaded opening in the support plate 55. A spacer or sleeve 62 fits over the shank of the bolt 60 and accurately spaces the upper end of the rod 57 from the plate 55. It will be understood that the upper end of the other vertical rod 57 and the lower ends of both support and guide rods 57 are similarly mounted and spaced from the support plate 55.

An elongated tubular bushing 63—63 is slidably mounted on each of the rods 57 in accurately machined and interfitting relationship so as to be vertically slidable thereon without slop or play.

A support block 64 is mounted on the bushings 63—63 underneath circumferential flanges or collars 65—65 on the bushings. The support block is normally held up against the collars or flanges 65 by means of a compression spring 66, the upper end of which bears against the underside of the block 64 and the bottom end of which rests on the horizontal portion of a bracket 67 mounted on the main support plate 55. The compression spring 66 may be formed of a suitable spring metal such as piano wire and will be of such strength and rate as to provide the desired force to lift and maintain the block 64 in its position against the collars 65—65 and also support whatever weight is carried by the support block 64. This weight includes the weight of a converter component 68 superposed in vertical alignment above a resonator or horn 70 of known type.

The operating end or surface 71 of the horn is aligned over the anvil or platen 53 so as to engage and operate on a workpiece supported therebetween. The lower end of the converter 68 sets in a counterbored recess 72 provided therefor in the upperside of the support block 64 with the front end of the support block being split as indicated at 73 so as to provide the necessary adjustment for receiving and clamping the lower end of the converter 68 in place. A recessed bolt 74 is provided so as to draw up the opposite sides of the split 73 and thereby tighten up the recess 72 with respect to the interfitting end of the converter 68. Additional support for the converter 68 may be provided by tie rods 75—75 extending on opposite sides thereof with the upper ends projecting through a converter cap 76 and the lower ends threaded into tapped holes in the upper side of the block 64 as indicated at 77.

The resonator or horn 70 will be coupled endwise into the lower end of the converter 76 in known manner and will project through an opening in the block 64 which is somewhat larger than the resonator 70 so as not to interfere with the freedom of movement thereof.

It will be seen that with the arrangement thus far described when the elongated bushings 63—63 are moved up and down on the vertical support and guide rods 57 the support block 64 moves up and down with the bushings and carries with it the converter 68 and the resonator 70 coupled thereto. The reciprocatory movement of the support block 64 may be provided by a single-acting pneumatic cylinder 78 having appropriate connections and controls of known type (not shown) and supported from the vertical plate 55 by a clamping bracket 80 (FIG. 7). The piston rod 81 of the cylinder unit 78 projects downwardly therefrom and carries a collar 82 which fits against the upper surface of the support block 64 while the end of rod projects into an aperture provided in the upper surface of the block 64.

It will be seen that in order to impart reciprocatory movement to the support block 64 and in turn to the elements mounted thereon, the cylinder 70 must deliver sufficient force through the piston rod 81 so as to overcome the force of the spring 66 to the extent that this force is not overcome by the combined weights of the support block 64, converter 68, horn 70, and bushings 63. Whatever this unbalanced force may happen to be, the pressure delivered to the cylinder 78 may be accurately controlled in known manner so as to overcome this force to any desired degree so that any desired net force or pressure may be accurately delivered repetitively not only to move the converter 68/resonator 70 downwardly but to control precisely and accurately the force and pressure which the operating end or surface 71 of the horn exerts against a workpiece. In many instances, it is highly desirable to be able to control such force or pressure on a workpiece with precision and accuracy.

The embodiment of my invention shown in FIGS. 7–10 lends itself to a number of changes including expansion or enlargement so as to substantially increase the capacity thereof. For example, the support plate 55 may be replaced with a substantially longer plate with the support/guide rods 57—57 being located adjacent opposite ends thereof. If desired, additional support/guide rods 57 may be mounted on the elongated plate 55 as required to provide adequate support and guiding action. The horn output end or operating surface 71 may be replaced with one which is substantially elongated. Alternately a plurality of coupled resonator 68/converter or horn 70 combinations or units may be mounted on the elongated support plate 55 with the output ends or operating surfaces being arranged generally in line and contiguous and secured together by dowl pins or other suitable fastening means. Through suitable control apparatus of known type a plurality of the coupled resonator 68/converter or horn 70 units may be operated manually (i.e. by foot or hand) or automatically either in unison, individually in sequence, or partly in unison and partly in sequence. If sufficient electrical power or capacity is available, unison operation will usually be desired such as for forming an elongated seam or a plurality of buttonholes in a garment in a single operation without moving the garment. On the other hand, a smaller power source can be used to provide sequential operation of a plurality of the coupled resonator 68/ converter or horn 70 combinations or heads.

I claim:

1. In apparatus for applying sonic or ultrasonic energy with precision to a workpiece disposed on anvil means and including at least one converter, a resonator or horn operatively coupled to each said converter, and means for imparting vertical reciprocating movement toward and away from said anvil means to each said coupled converter and resonator or horn, the improvement in means for supporting each said coupled converter and resonator or horn and for controlling and accurately guiding said reciprocating movement thereof, comprising, cantilever frame means, a pair of spaced upright support and guide rods rigidly mounted on said frame means and extending parallel to each other, bushing means slidable on each of said rods and having portions which are vertically spaced a substantial distance apart on said respective rods so as to provide at least spaced two-point sliding support on each rod, bracket means mounting said converter in cantilever fashion on said bushing means, and means operatively connecting each said coupled converter and resonator with said means for imparting reciprocating movement thereto.

2. In apparatus for applying sonic or ultrasonic energy with precision to a workpiece disposed on anvil means and including at least one converter, a resonator or horn operatively coupled to each said converter in vertical alignment therewith, and means for imparting vertical reciprocating movement toward and away from said anvil means to each said coupled converter and resonator or horn, the improvement in means for supporting each said coupled converter and resonator or horn and for controlling and accurately guiding said reciprocating movement thereof, comprising, cantilever frame means, a support block stationarily mounted on an upper and forward position on said frame means and generally over said anvil means, a pair of spaced and vertically aligned support and guide rods, means for rigidly mounting said rods on said frame means rearwardly of said support block, a pair of generally V or U-shaped horizontal mounting brackets to vertically and substantially spaced portions of each said converter, bushings mounted on the distal ends of said V or U-shaped mounting brackets having accurate sliding fit on said guide rods whereby each said converter is slidably mounted with spaced two-point support on each of said rods, said means for imparting vertical reciprocating movement to each said coupled converter and resonator or horn being mounted on said support block and above said converter, and means operatively connecting said means for imparting reciprocating movement to said converter.

3. The improvement of claim 2 wherein said cantilever frame means comprises a pair of upstanding matching plate-like members each having a vertical lower section adapted to be mounted on a support and an inclined upper portion, said plate-like members being toed in in the direction of said anvil means.

4. The improvement of claim 3 wherein said means for rigidly supporting said support and guide rods comprise a pair of upper and lower L-shaped members for each rod with one leg of each L-shaped member being secured to the inside of one of said plate-like members and with the other leg being attached to one end of its associated rod.

5. In apparatus for applying sonic or ultrasonic energy with precision to a workpiece disposed on an anvil means and including at least one converter, a resonator or horn operatively coupled to each said converter in superposed relationship therewith, and means for imparting vertical reciprocating movement toward and away from said anvil means to each said coupled converter and resonator or horn and for controlling and accurately guiding said reciprocating movement thereof, comprising cantilever frame means having a forward overhang portion and a rear support post portion, a pair of spaced and vertically aligned support and guide rods, means for rigidly mounting said rods on the forward overhang portion of said frame means, elongated bushings slidably mounted on said rods providing spaced two-point support on each of said rods, a mounting bracket rigidly secured on said bushings intermediate the upper and lower ends thereof and including clamping means securing each said converter thereon, spring means compressed between the underside of said bracket and a fixed support so as to bias said bracket upwardly, said means for imparting vertical reciprocating movement to each said coupled converter and resonator or horn being mounted on said forward overhang portion or said frame means and operatively connected with said bracket means so as to alternately push said bracket downward against the force of said spring means and to allow said bracket to rise under influence of said spring means thereby imparting controlled reciprocating movement to said converter.

* * * * *